United States Patent [19]
Hargis

[11] Patent Number: 6,009,306
[45] Date of Patent: *Dec. 28, 1999

[54] HUB COMMUNICATIONS SATELLITE AND SYSTEM

[76] Inventor: Keith J. Hargis, 3950 Huron Ave., Culver City, Calif. 90232

[*] Notice: This patent issued on a continued prosecution application filed under 37 CFR 1.53(d), and is subject to the twenty year patent term provisions of 35 U.S.C. 154(a)(2).

[21] Appl. No.: 08/595,455

[22] Filed: Feb. 5, 1996

[51] Int. Cl.⁶ .................................................. H04B 7/185
[52] U.S. Cl. .......................... 455/12.1; 455/13.3; 455/428
[58] Field of Search ................... 455/12.1, 13.1, 455/13.2, 13.3, 53.1, 33.1, 427, 428; 342/356

[56] References Cited

U.S. PATENT DOCUMENTS

| | | | |
|---|---|---|---|
| 3,497,807 | 2/1970 | Newton | 455/13.1 |
| 4,004,098 | 1/1977 | Shimasaki | 455/13.1 X |
| 4,375,697 | 3/1983 | Visher . | |
| 5,099,235 | 3/1992 | Crookshanks | 455/13.1 X |
| 5,119,225 | 6/1992 | Grant et al. | 455/12.1 X |
| 5,327,572 | 7/1994 | Freeburg | 455/13.1 |
| 5,410,728 | 4/1995 | Bertiger et al. | 455/13.1 |
| 5,471,641 | 11/1995 | Dosiere et al. | 455/13.1 |
| 5,615,407 | 3/1997 | Barkats | 455/13.1 |

FOREIGN PATENT DOCUMENTS 145246  1/1983  Japan ..................................... 455/13.1

OTHER PUBLICATIONS

Martin, James; *Telecommunications and the Computer*, Prentice Hall; Englewood Cliffs, New Jersey; 1976; pp. 280–301.

Couch II, Leon W.; *Digital and Analog Communications Systems*; Macmillan Publishing Co., New York, 1983; pp. 230–239.

*Primary Examiner*—Wellington Chin
*Assistant Examiner*—Philip J. Sobutka
*Attorney, Agent, or Firm*—Terje Gudmestad; Georgann Grunebach; Michael W. Sales

[57] ABSTRACT

A satellite communications system includes hub satellite which are equipped to communicate with at least three other satellites. The hub satellites include crosslink interfaces for each of the other satellites with which it may communicate and a switching system for routing those communications between interfaces. A system of a given number of satellites may include several hubs and may be configured in a way which permits any satellite within the system to communicate with a hub either directly or after transiting one or more intervening satellites. Systems which include fewer hubs may require communication with more than one intervening satellite before a hub is reached.

14 Claims, 6 Drawing Sheets

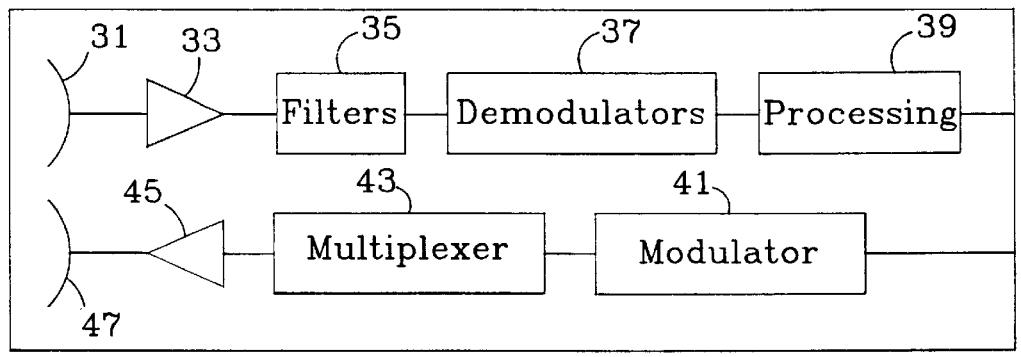
FIG.2C (Prior Art)
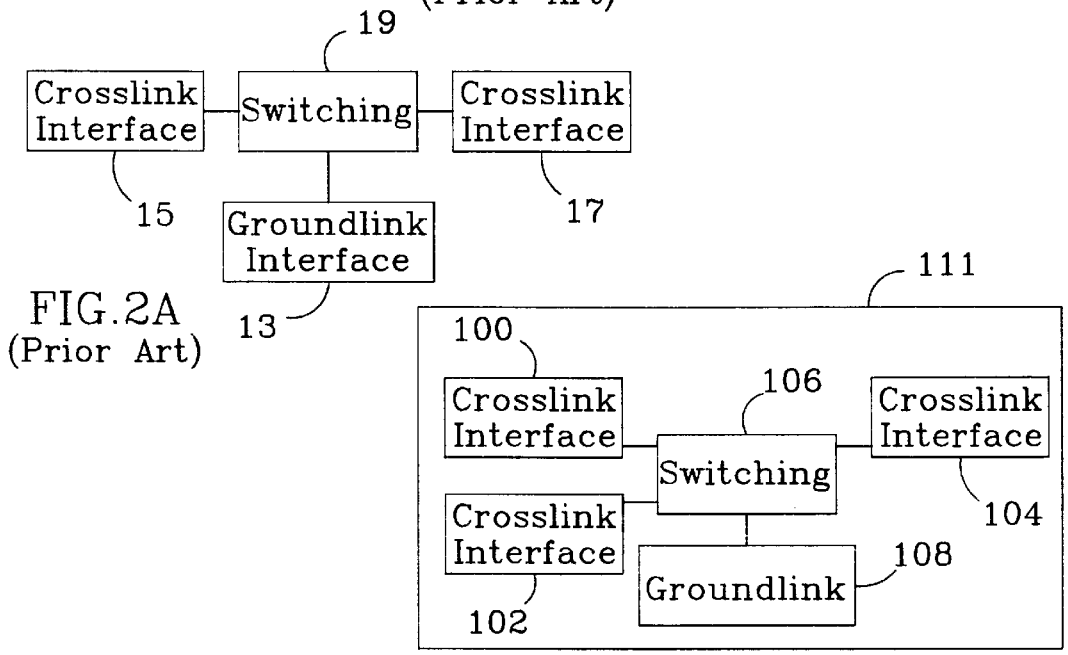
FIG.2A (Prior Art)
FIG.7A
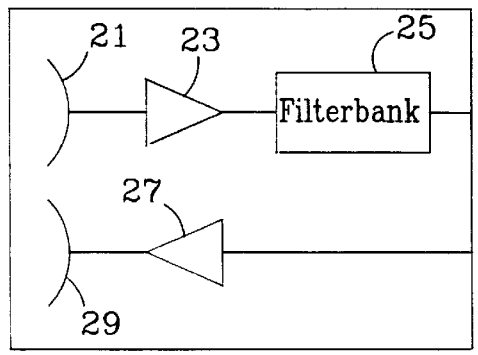
FIG.2B (Prior Art)
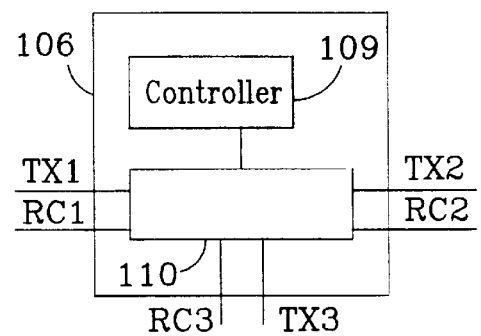
FIG.7B

HUB COMMUNICATIONS SATELLITE AND SYSTEM

BACKGROUND OF THE INVENTION

1. Field of the Invention

The invention is related to satellite communications and, more particularly, to geosynchronous satellites and communications based upon them.

2. Description of the Related Art

FIG. 1 illustrates a communications system employing three repeater stations which when spaced 120 degrees apart in the correct orbit could give television and microwave coverage to the entire planet. Using such a system allows a user to transmit a signal (e.g., video, voice data, etc.) from one ground station A to a "repeater" satellite B to another ground station C within the repeater satellite's field of view. For communications outside a particular satellite's field of view, the ground station A transmits to the satellite B which relays the signal to the ground station C. The ground station C is in the field of view of both satellite B and another satellite D. Ground station C relays the signal to satellite D, which transmits it to a ground station E within its field of view. Each "uplink", including amplifiers, antennas, and modulators at the ground station and receivers aboard the satellite, typically operate within one frequency band while the downlink operates within another. Transponders aboard the satellites typically bandpass filter an incoming signal from a receiving antenna and amplify the resultant signal using a low noise amplifier. The amplified signal is then down-converted by the transponder so that the signal occupies a different frequency band. This separation into transmitted and received signal bands prevents transmitted signals from interfering with received signals. After down-conversion, the transponder bandpass filters the down-converted signal and amplifies the resultant signal using a power amplifier such as a traveling wave tube amplifier.

Although the "ground-hopping" technique of FIG. 1 has the appeal of simplicity, it is not without its problems. The volume of communications traffic has increased markedly since the first operational synchronous satellite, Syncom II, was launched Jul. 26, 1963 and transmitted communications between a U.S. Army crew in Lakehurst N.J. and a U.S. Navy crew aboard the Kingsport, at harbor in Lagos, Nigeria. Not only has the volume of traffic increased for existing applications such as voice traffic, new applications have evolved which place a huge demand upon satellite channel capacity. "Superstations" originating in Atlanta and Chicago reach homes worldwide, as do motion pictures that are distributed directly from satellites to homes. The volume of data communications over satellite links has also expanded rapidly over the past twenty years.

Increased traffic volume led to revisions of the basic model illustrated in FIG. 1. For example, each satellite in FIG. 1 broadcasts over the more than 120 degrees of the Earth's surface within its field of view. Every terrestrial station receives the same signals at the same frequency. However vast the frequency spectrum may seem, it is limited and if, for example, one wishes to transmit one signal to one ground station using a given frequency channel, a different signal would be forced to use a different channel. The number of messages transmitted would therefore be limited, in a first order analysis, to the number of channels available within the frequency bands allotted to the satellite system. One method of expanding the number of messages that may be sent is to use narrow beam antennas to direct messages to smaller geographic areas. With this approach, frequency channels may be re-used in different geographic locations within the view of each satellite. This approach has been employed to expand the communications capacity of satellite systems.

The basic operational systems of a conventional communications satellite, including crosslinks, are illustrated in the block diagram of FIG. 2A. Communications satellites and their interfaces are known in the art; a more detailed description of the filtering, multiplexing, modulation, switching etc. may be found, for example, in, James Martin, *Telecommunications and the Computer*, Prentice Hall, Englewood Cliffs, N.J., 1976, pages 280–301. In the diagram of FIG. 2A, a ground link interface 13 provides an uplink, a downlink or both, between the satellite and a ground station such as ground station A illustrated if FIG. 1. Similarly, crosslink interfaces 15 and 17 provide for communications between neighboring satellites. The switching block 19 controls the flow of communications from one interface to another.

FIG. 2B illustrates an interface in greater detail. This interface could be a crosslink interface such as 15 or 17 of FIG. 2A or a downlink interface such as 13. The illustrated interface is employed in satellites which are essentially "bent pipe" relays, i.e., the satellites perform no processing on received signals and simply relay them to another satellite or ground station. A receiving antenna 21 receives signals which have been multiplexed into a specified frequency band and relays the signals to a receiver 23. From the receiver, the signals are sent to a filter bank 25 which separates the various signals and their carriers. These are sent to the switching block 19 for routing to another interface. Signals coming from the switching block 19 are connected to a transmitter 27 which sends the signals to a transmitting antenna 29.

An interface used in processing satellites, i.e. those which demodulate received signals and perform signal conditioning, compression, or regeneration, etc., is illustrated in FIG. 2C. A receiving antenna 31 receives transmissions from another satellite or a ground station and passes the signal to a receiver 33. The receiver then passes the signal to a filter bank 35 which separates the received transmission into individual frequency bands. Demodulators 37 demodulate the signals and pass them to a processing subsystem 39 which may perform signal conditioning, regeneration, etc. upon the recovered signals. From the processing subsystem 39, the signals are passed to a switching block, such as block 19 shown in FIG. 2A, which routes the signals as described in relation to that FIG. On the transmitting side, signals received from a switching block for transmission are routed to a modulator 41 where they are combined with carrier frequencies for transmission. The modulated signals are passed to a multiplexer 43 which combines the modulated signals and passes the resultant signal to a transmitter 45 that employs an antenna 47 to transmit the signals to a ground station or to another satellite. One satellite may have several narrow beam antennas directed toward different locations on the Earth's surface (with accompanying transmitters, modulators and multiplexers, where appropriate).

The use of narrow beam antennas in combination with ground hopping has expanded the capacity of satellite systems and constitutes the standard model for satellite communications systems. But capacity-related problems remain. The most desirable frequency bands are a 500 MHz band centered at 6 Ghz for satellite uplinks and a 500 MHZ band centered at 4 Ghz for downlinks. In these bands the equipment is relatively inexpensive, cosmic noise is small, and losses due to ionospheric scintillation and rainfall are relatively insignificant. However, terrestrial microwave links are already assigned to operate in these bands. To accommodate growing communications traffic, additional, less desirable, bands have been assigned; communications in the K-band employ 14 Ghz on the uplink and 12 Ghz on the downlink and direct-to-the-home television broadcasting uses a 17 Ghz uplink and a 12 Ghz downlink.

Even with this capacity expansion, satellite systems are once again confronting capacity limitations. The downlinks used to relay signals from satellites to ground stations often create bottlenecks, in part because these links must share their frequency band with terrestrial microwave transmission systems that can cause interference and in part because communications traffic from many parts of the world are essentially "funneled" through the downlinks, even though the ground station at the receiving end of the downlink may not be the ultimate target of the communications. Additionally, each "hop" entails a trip of approximately 70,000 km with a concomitant signal delay of approximately 240 ms. Although this delay may not be significant in some signal applications, interactive applications such as voice cannot practically accommodate more than a few such delays. Atmospheric distortions degrade signals as they hop from satellite to ground and on to another satellite. Each transit of a satellite introduces further signal degradation in the form of phase noise, distortions and intermodulation products generated by the satellite's transponders. Depending upon the application and the initial signal quality, there may be a need for signal regeneration. Satellites which perform this regeneration are sometimes referred to as "processing" satellites. The additional functionality of processing satellites comes at a price and it is generally desirable to limit the number of processing satellites within a satellite system.

SUMMARY OF THE INVENTION

The invention is directed to a geosynchronous communications satellite that, when used in combination with other satellites in a communications system, improves signal quality, reduces costs and increases capacity utilization to end users.

The new satellite circumvents the bottlenecks created by conventional, "ground-hopping" satellite communications systems, reduces the signal degradation due to phase noise, distortions and intermodulation products introduced into signals by satellites as the signals are relayed from one point on earth to another, and limits the delays imparted to signals as they are transmitted through the system.

The invention comprises a "hub" satellite which includes at least three crosslink interfaces and a switching system. In operation, each crosslink interface is directed toward another satellite and the switching system routes signals from one interface to another. A satellite communication system may employ one or more hub satellites to route signals among the satellites within the system. A system having a given number of satellites (with a minimum of four) may include several hubs and may be configured in a way that permits any satellite within the system to communicate directly with a hub. Alternatively, the system may allow any satellite within the system to communicate with a hub after transiting no more than one intervening conventional satellite. Systems which include fewer hubs may require communication with more than one intervening satellite before a hub is reached.

The new geosynchronous satellite communications system includes at least two ground stations having interfaces directed at two different satellites. In a minimal, two-ground station embodiment, one of the ground stations includes an uplink interface to one of the satellites and the other ground station includes a downlink from another of the satellites.

These and other features, aspects and advantages of the invention will be apparent to those skilled in the art from the following detailed description, taken together with the accompanying drawings.

BRIEF DESCRIPTION OF THE DRAWINGS

FIG. 2A is a block diagram illustrating various interfacing components that may be found in a conventional communications satellite.

FIG. 2B is a block diagram of a conventional "non-processing" satellite interface.

FIG. 2C illustrates a conventional "processing" satellite interface.

FIG. 7A is a block diagram showing the basic components of a hub satellite.

FIG. 7B is a block diagram that provides a more detailed view of the switching system of FIG. 6A.

DETAILED DESCRIPTION OF THE INVENTION

Figure 1:
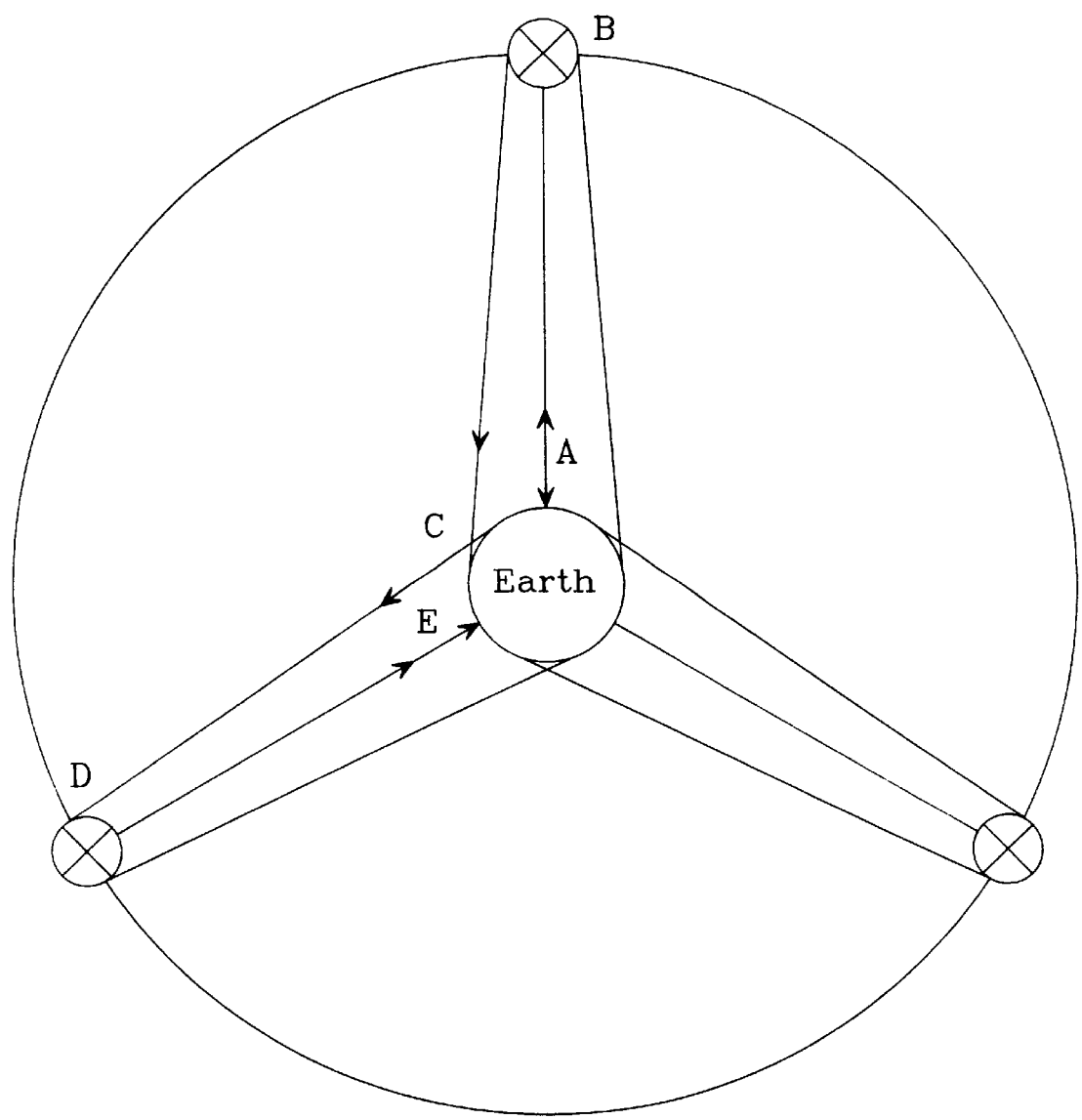
FIG. 1 is a diagram of a prior art satellite communications system which employs "ground-hopping" techniques.
Figure 3:
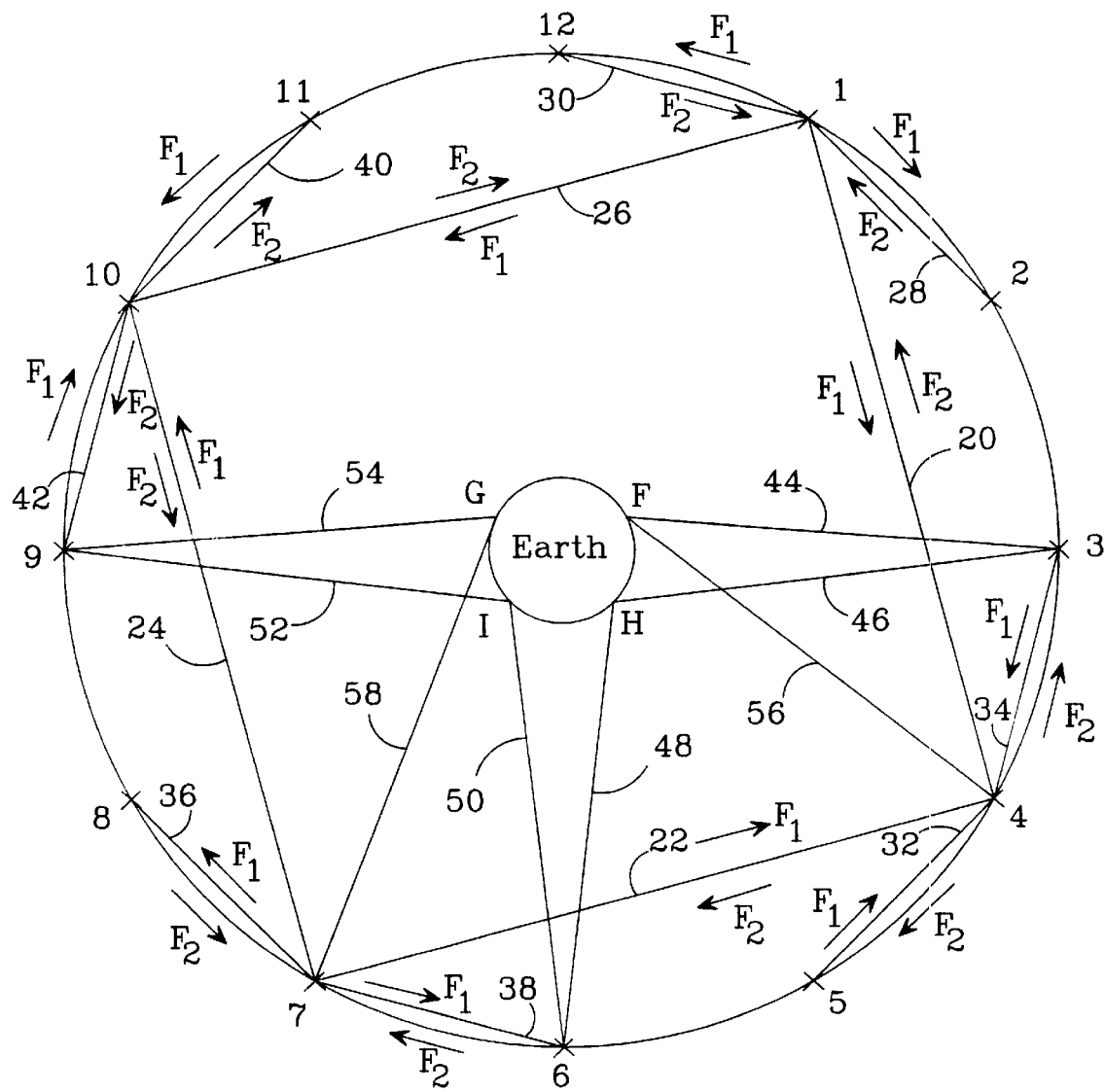
FIG. 3 is a diagram of a twelve-satellite "open hub" embodiment of the new satellite communications system.

The twelve satellite geosynchronous communications system of FIG. 3 illustrates a preferred embodiment of a novel satellite communications system which employs the new hub satellite. Although twelve equally-spaced satellites are illustrated, the benefits of the invention apply to any system which employs more than three satellites. The satellites needn't be equally-spaced, nor do they need to be coplanar as they are illustrated, although the most desirable distribution is one wherein the satellites are all geostationary, i.e., they are all geosynchronous within the plane of the equator. For simplicity, the satellites will be referred to by their "clock location". That is, the 3 (o'clock) satellite occupies the 0 degree position at the center-right of the orbit, the 12 (o'clock) satellite occupies the 90 degree location at the top of the orbit, etc. The Earth is located at the center of FIG. 3 and the distance along the most direct path from the Earth's surface to a satellite is approximately 35,800 km. The line of sight distance between any two nearest neighboring satellites is approximately 21,800 km.

In the illustrated preferred embodiment, every satellite is connected to all the other satellites through a crosslink, i.e., transmission path and crosslink interfaces, but there are no direct crosslinks between satellites 2 and 3, 5 and 6, 8 and 9 or 11 and 12. These "openings" between satellites lead to the "open hub" appellation. Four of the illustrated satellites, 1, 4, 7 and 10, are new "hub" satellites, each of which includes at least three crosslinks (four are required in this embodiment). The additional crosslinks permit hub satellites to communicate with more than just nearest-neighbor satellites. Hub satellites will be described in greater detail in relation to FIG. 6. The hub satellites are interconnected, 1 to 4, 4 to 7, 7 to 10, and 10 to 1, via crosslink transmission paths 20, 22, 24 and 26, respectively. Additionally, satellite 1 is connected to satellites 2 and 12 through paths 28 and 30, satellite 4 to 5 and 3 through paths 32 and 34, satellite 7 to satellites 8 and 6 through paths 36 and 38, and satellite 10 to 11 and 9 through paths 40 and 42. Any of the crosslink paths 20 through 42 may be a one-way or a two way path.

Generally, different frequency bands are required for transmitting and receiving at a given satellite. In the Ka band, crosslinks may employ the 300 MHZ channel between 24.45 and 24.75 Ghz, or the 1 Ghz channels centered on 23.05 and 32.5 Ghz. In the V band, crosslinks may use the 5 Ghz band centered on 61 Ghz. Furthermore, it is expected that in the future light-wave communications, which require low-absorption, low-scattering guiding materials such as optical fibers when operated within the atmosphere, will provide even greater bandwidth for inter-satellite communication systems, where optical systems may operate without guiding media. Each crosslink in the figure is marked with an arrow labeled f1 or f2, indicating a frequency band and a direction of information flow. For example, all cross link communication into satellite 1 is via frequency band f2 and all crosslink communications out of satellite 1 is via frequency band f1. These and other aspects of hub satellites will be discussed in greater detail in relation to FIG. 6.

By way of example, it will be assumed that a transmission must be made from a ground station F, directly beneath satellite 3, to another ground station G directly beneath satellite 9 and on the opposite side of the Earth. Using the prior art ground-hopping approach, the transmission could travel from the ground station F, along path 44 directly overhead to satellite 3, from satellite 3 along path 46 to ground station H which is located within the field of view of both satellites 3 and 6. From ground station H, the signal travels along path 48 to satellite 6, and from satellite 6 along path 50 to a ground station I, located within the fields of view of both satellites 6 and 9. The signal is relayed from ground station I along a path 52 to satellite 9, and from satellite 9 along path 54 to the final destination, ground station G.

In practice, the overall path may be more convoluted than the one illustrated, requiring a greater number of satellite transits than three. For example, the path 48 which permits the use of satellite 6 may be fully occupied, necessitating use of satellites 5 and/or 7, in addition to satellites 3,6 and 9. But, assuming for now that the illustrated 44–54 path may be employed, the total signal path-length is approximately 224,000 km, with a corresponding delay of 745 ms. Furthermore, the signal must travel through the atmosphere six times, with the resulting atmospheric signal degradations compounded on each trip. Additionally, each trip through a satellite degrades the signal and this path requires the signal to travel through three satellites. For these reasons, one of the satellites may have to be a more expensive processing satellite in order to assure signal quality at the final destination, ground station G.

Using the novel hub satellite system, the same signal travels path 56 from ground station F to hub satellite 4, path 22 from hub satellite 4 to hub satellite 7 and path 58 from hub satellite 7 to the ground station G. In this case, the total distance traveled is approximately 135,000 km, introducing a delay of 450 ms, significantly less than that introduced by the conventional "ground hopping" approach. Furthermore, the atmospheric signal degradation is cut by almost two thirds, and the signal transits fewer satellites, thereby reducing signal degradation due to phase noise, intermodulation products, and other satellite-related signal distortions.

Note that, using this novel hub satellite constellation, no satellite is more than one crosslink from a hub satellite. That is, each conventional satellite has a hub satellite as a nearest neighbor. Not only may the hub satellites reduce the number of uplinks and downlinks required to transfer a signal around the world, as just illustrated, they also reduce the number of satellites that must be employed in such a transfer. This elimination of "hops" and reduction in the number of satellites transited may permit a reduction in the number of, or complete elimination of, costly processing satellites for a given system.

Suppose, for example, that instead of employing conventional ground hopping techniques, the signal were sent entirely by conventional satellite via crosslinks. That is, suppose the signal is transferred using the path 56 from ground station F to satellite 4, from satellite 4 to satellite 5 via the path 32, from satellite 5 to satellite 6 (along a crosslink path that does not exist in this embodiment), from satellite 6 to satellite 7 along path 38, and from satellite 7 to ground station G. The total distance for this trip is slightly longer than that for the hub example and the atmospheric impact is approximately the same, but this approach involves twice the number of satellites and, consequently, twice the signal degradation due to satellite signal distortions. Additionally, this approach requires more crosslink capacity than the hub system and therefore inefficiently utilizes crosslink spectrum.

Figure 4:
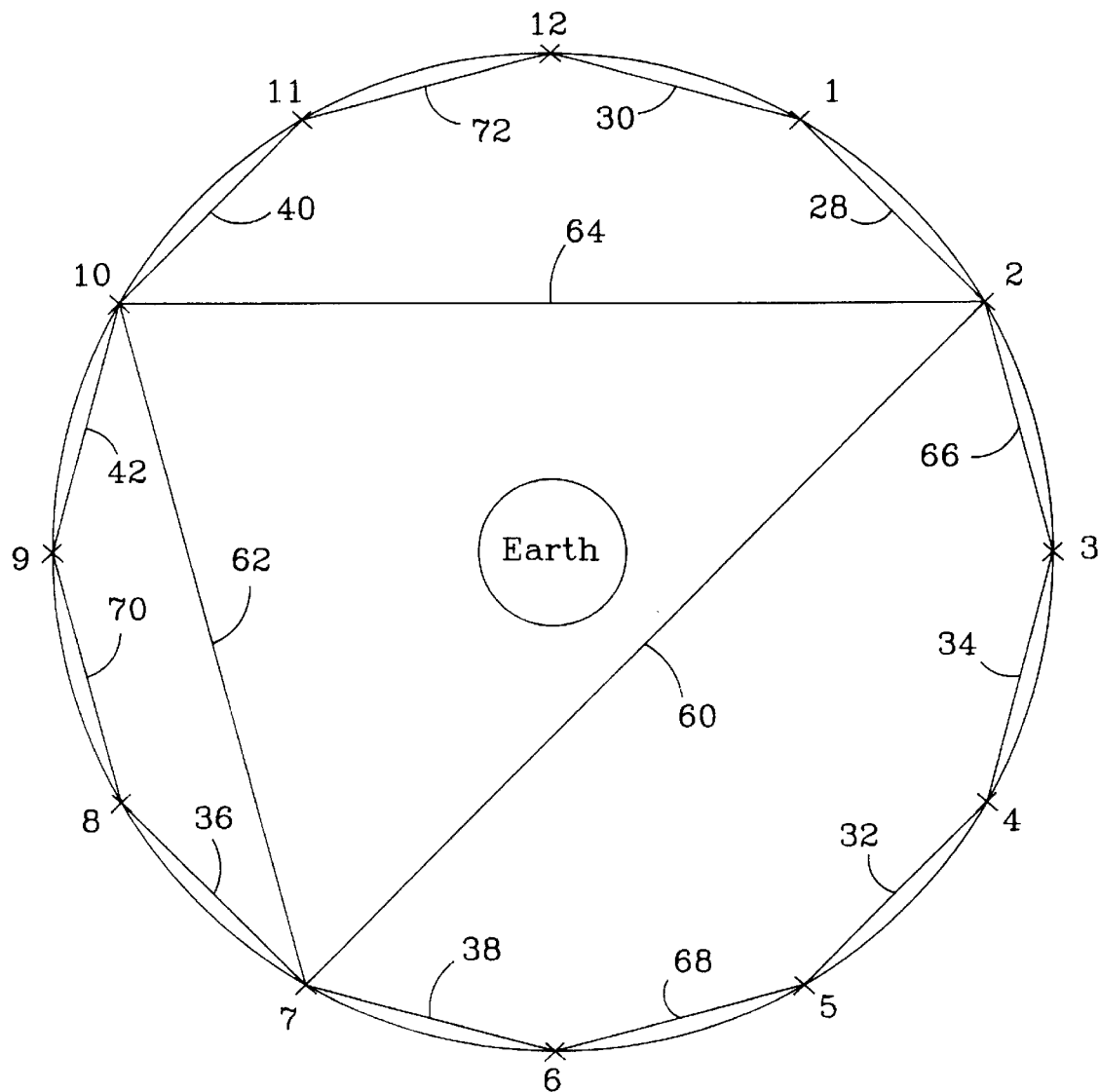
FIG. 4 is a diagram of a twelve-satellite "closed hub" embodiment of the new satellite communications system.

In the closed hub embodiment of FIG. 4, satellites 2, 7 and 10 are hub satellites. Satellite 2 is connected to satellite 7 via a crosslink 60, satellite 7 is connected to satellite 10 via a crosslink 62, and satellite 10 is connected to satellite 2 via a crosslink 64. In addition to the crosslinks discussed in relation to FIG. 3, this embodiment includes crosslinks 66, 68, 70, and 72 between satellites 2 and 3, 5 and 6, 8 and 9, and 11 and 12, respectively. This embodiment provides all the conventional satellites with access to a hub satellite after transiting no more than one nearest neighbor satellite. That is, a signal from conventional satellite 5 may be transmitted to hub satellite 10 using only two intervening satellites (6 and 7) rather than four (6, 7, 8 and 9). As noted in the description of FIG. 3, reducing the number of satellites employed in a given signal transfer proportionately reduces signal degradation. This feature, no more than one intervening satellite between any given satellite and a hub satellite, may readily be extended to systems employing more than three satellites.

Figure 5:
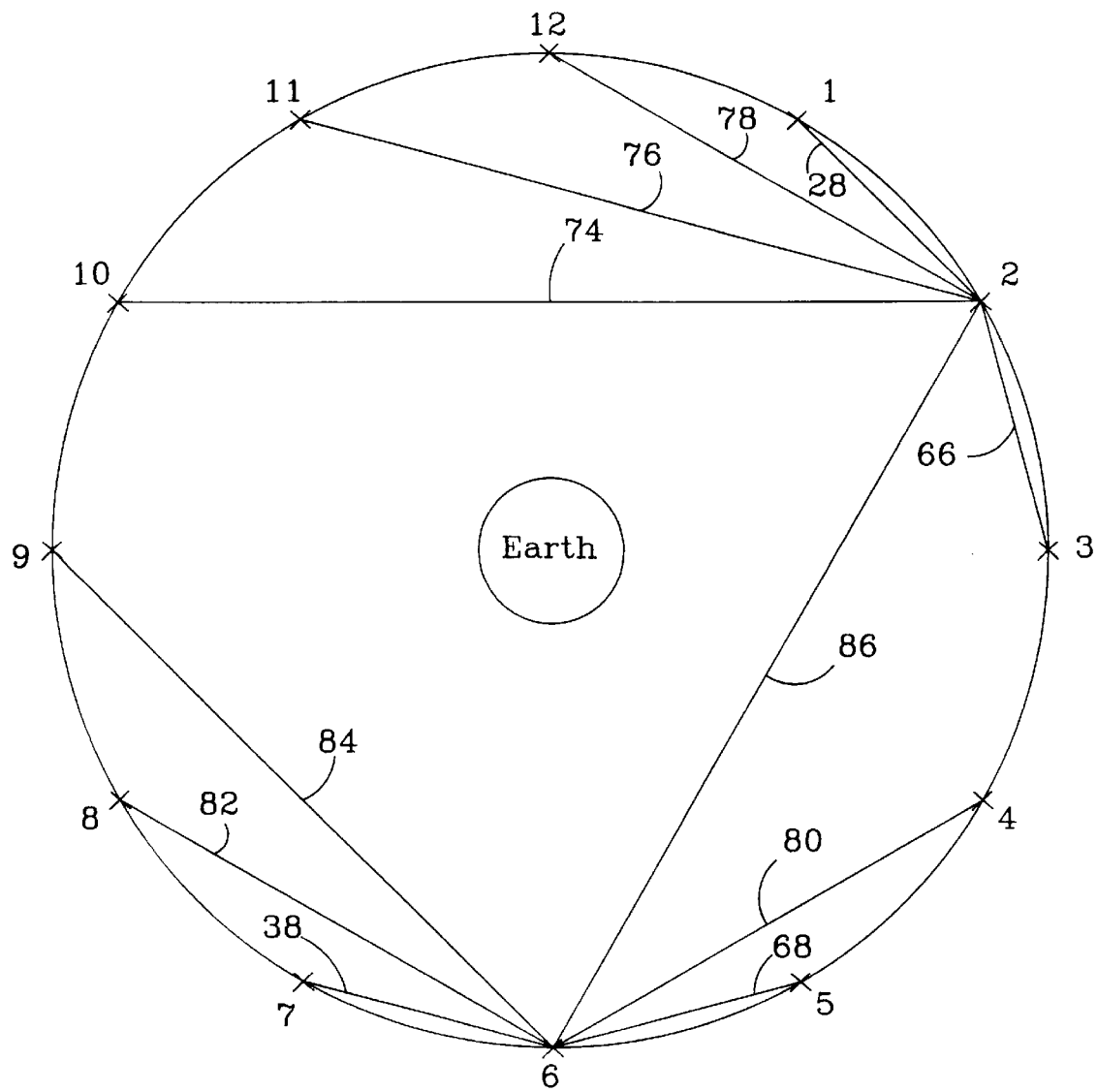
FIG. 5 is a diagram of a two-hub, twelve-satellite embodiment of the new satellite communications system.

The embodiment of FIG. 5 provides every satellite in the system with direct access to one of the hub satellites, 2 or 6. Satellites 1, 3, 10, 11, and 12 are connected to hub satellite 2 via crosslinks 28, 66, 74, 76 and 78, respectively. Satellites 4, 5, 7, 8 and 9 are connected to satellite 6 through crosslinks 80, 68, 38, 82 and 84, respectively. Additionally, hub satellites 2 and 6 are connected via crosslink 86. Not only do all the satellites in this embodiment have direct contact with a hub satellite, only two hub satellites are required for this twelve-satellite system.

Figure 6:
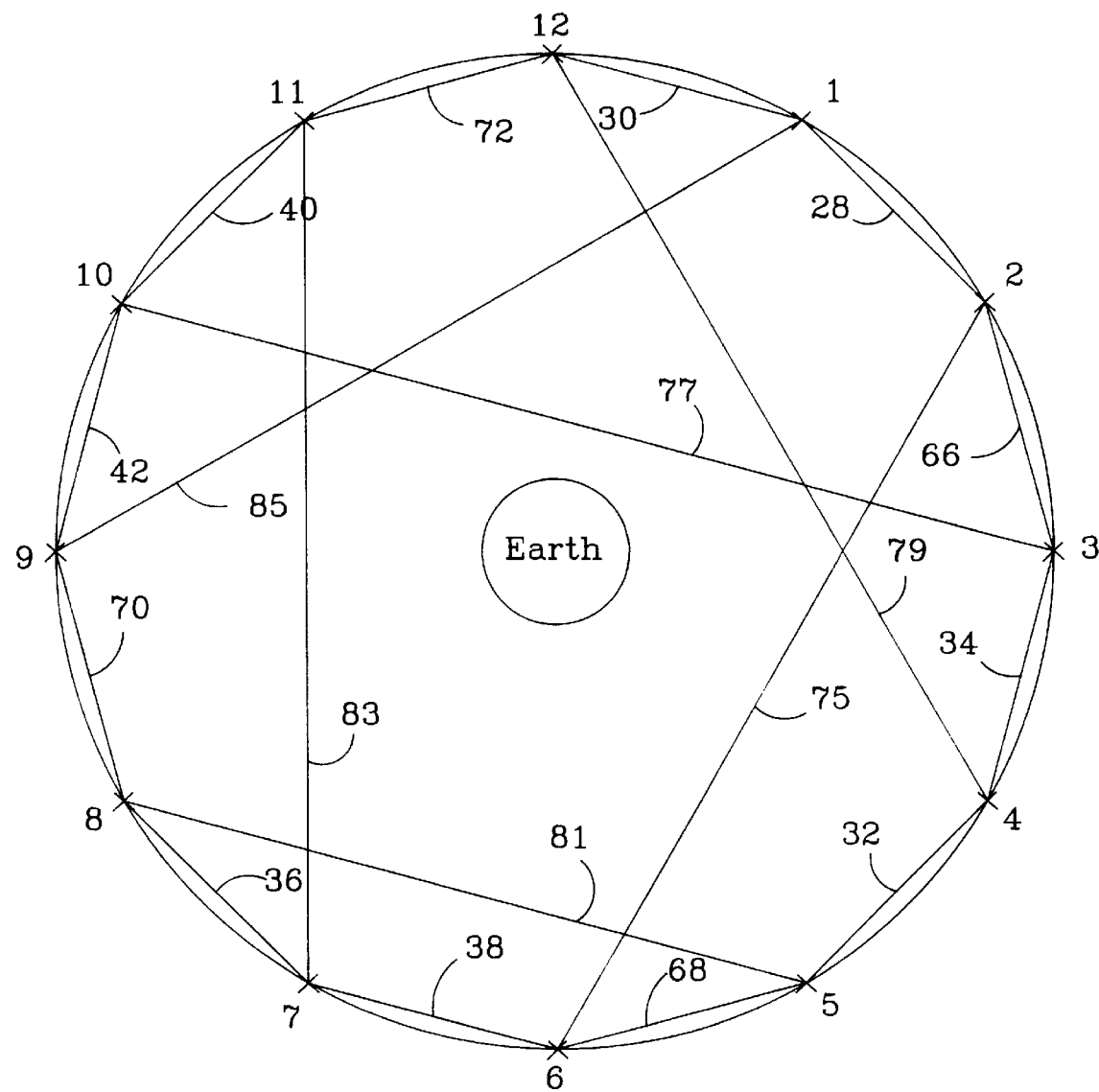
FIG. 6 is a diagram of a twelve-satellite "mesh" system, in which every satellite is a hub satellite.

The "mesh" system of FIG. 6 is composed entirely of hub satellites, i.e., every satellite within the constellation has at least three crosslink interfaces. As in the embodiment of FIG. 4, every satellite is connected to its nearest neighboring satellite, 12 to 1, 1 to 2, etc. through crosslinks 30, 28 etc. respectively. Additionally, satellites 2 and 6, 3 and 10, 4 and 12, 5 and 8, 6 and 2, 7 and 11, and 9 and 1 are connected via crosslinks 75, 77, 79, 81, 83 and 85, respectively. Since every satellite within this mesh system is a hub satellite, there is more flexibility in routing communications and, therefore, the communications load may be more evenly distributed among the satellites.

Each hub satellite includes the functional subsystems illustrated in the block diagram of FIG. 7A. Crosslink interfaces 100, 102, and 104 are interconnected via a switching system 106. The crosslink interfaces 100–104 may be either processing or non-processing interfaces, as described in relation to FIGS. 2B and 2C, respectively, and can be designed the same as in prior systems. An optional ground link interface 108 is also illustrated, but a hub satellite 111 needn't include a ground link. While a conventional satellite may include crosslink interfaces for communications with its nearest neighbors, a hub satellite includes at least three crosslink interfaces, permitting direct communication with satellites other than its nearest neighboring satellites. In order to facilitate these links with non-nearest neighbor satellites, e.g., any of the links 60, 62, or 64 of FIG. 4, one of the crosslink interfaces may incorporate a larger antenna or more powerful amplifier than required for nearest-neighbor crosslinks such as 28 or 66.

Satellite systems may employ a number of techniques to provide access to the communications channels they provide. Hub satellites may provide access through techniques such as frequency-division multiple access (FDMA), time-division multiple access (TDMA), code-division multiple access (CDMA) or spread spectrum multiple access (SSMA). Additionally, a fixed assignment, multiple access (FAMA) or demand assignment multiple access mode may be used in conjunction with any of the above techniques. These techniques are known in the art; a more detailed discussion may be found in, Leon W. Couch II, *Digital and Analog Communications Systems*, Macmillan Publishing Co., New York, 1983, pages 230–239. Although these techniques have been applied to satellite-to-ground links, the novel hub satellites provide access to inter-satellite communications channels using these techniques.

A switching system such as system 106 of FIG. 7A is illustrated in more detail in FIG. 7B. A controller 109 directs the interconnection of signal paths through a switch 110. In an analog switching implementation, the switch 110 is, basically, a cross-bar switch that, under control of the controller 109, interconnects any of the transmit paths TX1, TX2, or TX3, associated with crosslink interfaces 100, 102 and 104, respectively, with any of the receive paths RC1, RC2, or RC3, associated with crosslink interfaces 100, 102, and 104, respectively. The controller 109 may be responsive to ground commands or to commands from another satellite, for example. A digital switching implementation may employ the same basic circuit switching just described or it may employ other switching techniques, such as packet switching, or message switching, using the same basic structure of a switch 110 under control of a controller 109.

A minimum of three crosslink interfaces are required to implement hub satellite systems such as those discussed in relation to FIGS. 3–6. For example, satellites within a closed hub system such as that illustrated in FIG. 4 would require three crosslink interfaces: one for each of its nearest neighboring satellites and one for a cross-orbit link such as the link 60 between hub satellites 2 and 7. As noted above, this arrangement provides access to a hub satellite through one intervening satellite, at most. Similarly, a hub satellite within an open hub system such as illustrated in FIG. 3 would require four crosslinks: one for each of its nearest neighbors and one for each of its cross-orbit links, such as links 20 and 26, for example.

As described to this point, the hub satellite systems provide improved signals due to the elimination of multiple atmospheric passes and a relatively low number of satellite transits. Additionally, the distance a signal must travel may be significantly reduced when compared with the distance it would travel using ground-hopping techniques. This results in a corresponding reduction in delay, which is especially significant in interactive signaling applications.

In addition to these benefits, hub satellite systems may eliminate the bottlenecks that conventional, ground-hopping systems encounter. Hub systems can circumvent bottlenecks by routing around particularly busy up/downlink locations. Additionally, crosslinks have been assigned much higher bandwidth channels than existing up/downlink channels and with the advent of "open space" light wave communications, inter-satellite communications channels will expand further. Another advantage of the novel hub systems is that, because signals may be routed more directly-eliminating satellite transits as well as ground hops-the number of costly processing satellites, i.e., those which regenerate signals, may be significantly reduced.

The forgoing description of specific embodiments of the invention has been presented for the purposes of illustration and description. It is not intended to be exhaustive or to limit the invention to the precise forms disclosed, and many modifications and variations are possible in light of the above teachings. For example, the crosslinks may use higher-frequency links, such as lightwave links. The total number of satellites may be greater or less than in the embodiments illustrated, and the number of hub satellites may also be greater or less than those illustrated. The embodiments were chosen and described in order to best explain the principles of the invention and its practical application, to thereby enable others skilled in the art to best utilize the invention. It is intended that the scope of the invention be limited only by the claims appended hereto.

I claim:

1. A satellite communications system for facilitating communications between communications ground stations of Earth, comprising:
   a communications constellation distributed throughout one orbit around said Earth, said communications constellation formed with:
   a) a plurality of satellites which each occupies a different position in said orbit and therefore has a pair of adjacent nearest-neighbor satellites;
   b) a pair of crosslink interfaces positioned in each of said satellites to facilitate communications crosslinks with each of its nearest-neighbor satellites;
   c) a plurality of groundlink interfaces which are each positioned in a different one of said satellites to facilitate a communications groundlink between that satellite and one of said communications ground stations; and
   (d) at least one pair of cross-orbit crosslink interfaces which are each positioned in a different one of a pair of satellites that are not nearest-neighbor satellites to facilitate a cross-orbit communications link across said communications constellation;
      wherein said cross-orbit communications link is absent in at least one of said satellites;
      and wherein the number of pairs of cross-orbit crosslink interfaces is sufficient to prevent any one of said satellites from being separated from a cross-orbit communications link by more than one intervening satellite;
   each of said satellites of said communications constellation thereby provided with at least three alternate communication paths to each other of said satellites which enhances communications routing flexibility between said satellites and said communications ground stations.

2. The satellite communications system of claim 1, wherein said orbit is a geosynchronous orbit.

3. The satellite communications system of claim 1, wherein said orbit is a geostationary orbit.

4. The satellite communications system of claim 1, wherein each of said satellites further includes a communications switching system which couples communications signals between any crosslink interfaces, groundlink interface and cross-orbit crosslink of that satellite.

5. The satellite communications system of claim 4, wherein said switching system includes:
  a controller; and
  a switch which interconnects communications signals in response to said controller.

6. The satellite communications system of claim 5, wherein said switch is a cross-bar switch.

7. The satellite communications system of claim 4, wherein each of said crosslink interfaces, said groundlink interfaces and said cross-orbit crosslink interfaces includes:
  a receiving antenna;
  a receiver arranged to couple communications signals from said receiving antenna to said switching system;
  a transmitting antenna; and
  a transmitter arranged to couple communications signals from said switching system to said transmitting antenna.

8. A satellite communications system for facilitating communications between communications ground stations of Earth, comprising:
  a communications constellation distributed throughout one orbit around said Earth, said communications constellation formed with a plurality of satellites which each occupies a different position in said orbit;
  at least two satellite groups formed by said satellites with each of said groups including:
    a) a hub satellite;
    b) a plurality of group satellites;
    c) in each of said group satellites, a direct-access crosslink interface to facilitate a direct-access communications crosslink between that group satellite and said hub satellite; and
    d) in each of said group satellites, a groundlink interface to facilitate a communications groundlink between that group satellite and one of said communications ground stations;
  and
  at least one cross-orbit communications link across said communications constellation that is facilitated by a pair of cross-orbit crosslink interfaces which are each positioned in a different one of a pair of hub satellites;
  wherein said cross-orbit communications link is absent in all of said group satellites.

9. The satellite communications system of claim 8, wherein said orbit is a geosynchronous orbit.

10. The satellite communications system of claim 8, wherein said orbit is a geostationary orbit.

11. The satellite communications system of claim 8, wherein each of said satellite groups further includes a communications switching system which couples communications signals between any direct-access crosslink interface, groundlink interface and cross-orbit crosslink of that satellite group.

12. The satellite communications system of claim 11, wherein said switching system includes:
  a controller; and
  a switch which interconnects communications signals in response to said controller.

13. The satellite communications system of claim 12, wherein said switch is a cross-bar switch.

14. The satellite communications system of claim 8, wherein each of said direct-link crosslink interfaces, said groundlink interfaces and said cross-orbit crosslink interfaces includes:
  a receiving antenna;
  a receiver arranged to couple communications signals from said receiving antenna to said switching system;
  a transmitting antenna; and
  a transmitter arranged to couple communications signals from said switching system to said transmitting antenna.

* * * * *